(12) United States Patent
Yamaguchi et al.

(10) Patent No.: US 8,137,019 B2
(45) Date of Patent: Mar. 20, 2012

(54) INK COMPOSITION FOR WRITING INSTRUMENT AND WRITING INSTRUMENT

(75) Inventors: Mayumi Yamaguchi, Tokyo (JP); Yu Tsukamoto, Hatogaya (JP); Akinori Tanaka, Tokyo (JP)

(73) Assignee: Zebra Co., Ltd., Tokyo (JP)

( * ) Notice: Subject to any disclaimer, the term of this patent is extended or adjusted under 35 U.S.C. 154(b) by 409 days.

(21) Appl. No.: 12/546,408

(22) Filed: Aug. 24, 2009

(65) Prior Publication Data

US 2010/0054848 A1    Mar. 4, 2010

(30) Foreign Application Priority Data

Sep. 2, 2008 (JP) ................ P2008-224903

(51) Int. Cl.
*B05C 17/00* (2006.01)
*C09D 11/00* (2006.01)
*C08L 31/04* (2006.01)

(52) U.S. Cl. ...... 401/209; 106/31.6; 106/31.9; 523/161; 524/557

(58) Field of Classification Search .............. 401/208, 401/209; 106/31.6, 31.85, 31.9; 523/161, 523/160; 524/556, 557

See application file for complete search history.

(56) References Cited

U.S. PATENT DOCUMENTS

| 4,585,815 A * | 4/1986 | Ono et al. ................ 524/23 |
| 6,770,688 B1 * | 8/2004 | Miyamoto ................ 523/161 |
| 2004/0114987 A1 | 6/2004 | Fujii |

FOREIGN PATENT DOCUMENTS

| EP | 0845509 | 6/1998 |
| JP | 2007-327003 A | 12/2007 |
| WO | WO-2008/101146 | 8/2008 |

OTHER PUBLICATIONS

European search report mailed Dec. 15, 2009 directed to application No. 09167965.4-2102; (5 pages).

* cited by examiner

*Primary Examiner* — David Walczak
(74) *Attorney, Agent, or Firm* — Morrison & Foerster LLP

(57) ABSTRACT

The ink composition for a writing instrument has an aqueous component containing water, a thixotropic agent, a polyhydric alcohol and a pigment, dispersed in an oil component having dyes and non-dye components, wherein the IOB value for all of the dyes in the oil component is no greater than 0.9.

16 Claims, 1 Drawing Sheet

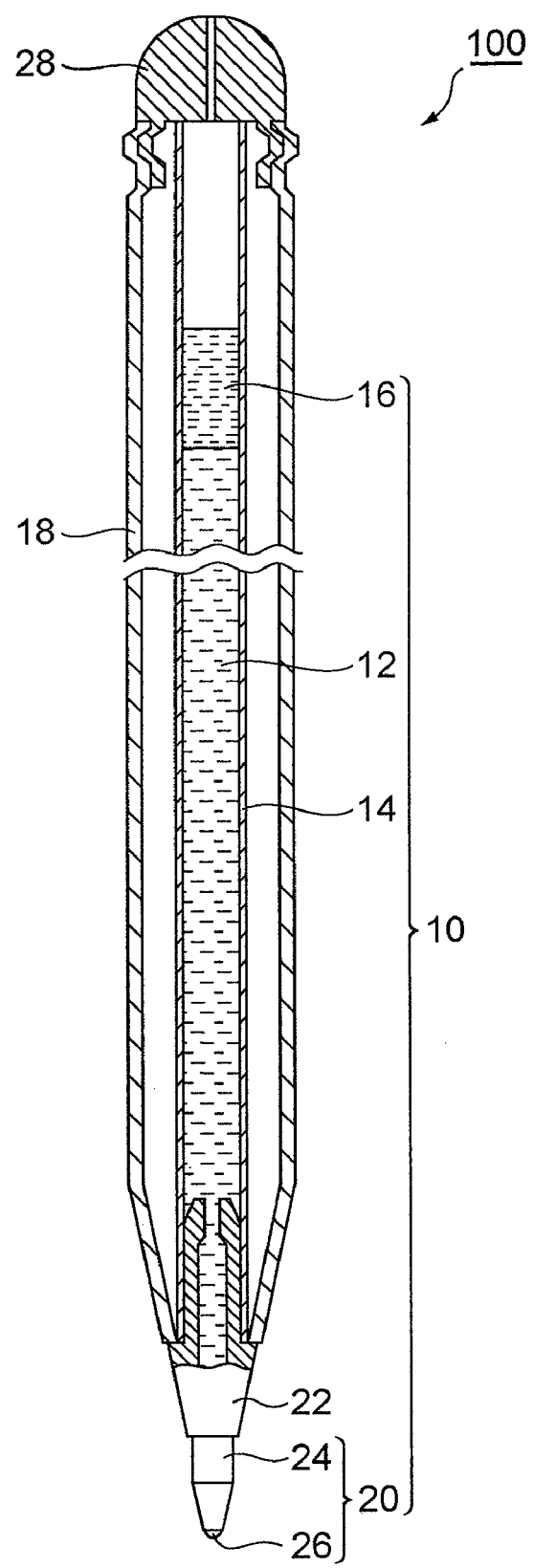

INK COMPOSITION FOR WRITING INSTRUMENT AND WRITING INSTRUMENT

BACKGROUND OF THE INVENTION

1. Field of the Invention

The present invention relates to an ink composition for a writing instrument and to a writing instrument.

2. Related Background Art

Oil-based inks comprising oil components have conventionally been used as oil-based ball-point pen inks. In recent years, W/O type emulsion inks, having aqueous components dispersed in oil components containing dyes or polar solvents, have been proposed as substitutes for conventional oil-based inks with the aim of improving many properties including smooth writing, thin writing spots, bleeding and blotting. When such W/O type emulsion inks are used to fill writing instruments such as oil-based ball-point pens, they are required to have excellent dispersion stability from the viewpoint of maintaining superior writing properties for prolonged periods.

Japanese Unexamined Patent Publication No. 2007-327003 which will be referred to as "Patent document 1" hereafter, for example, discloses an ink composition for a writing instrument having excellent dispersion stability even when it contains a pigment. Patent document 1 describes adding a pigment to an aqueous component and combining the mixture with an oil component, to obtain an ink composition with droplets comprising a pigment-dispersed aqueous component dispersed in the oil component, the composition being satisfactory in terms of long-term stability, smooth writing, writing density and writing fastness.

SUMMARY OF THE INVENTION

Ink compositions for writing instruments, when used, are filled into the ink holding tubes of writing instruments such as oil-based ball-point pens. Usually before the filling, the ink composition for a writing instrument is stored for a prescribed period of time in a storage container. From the viewpoint of reducing variation in the quality of writing instruments between lots, it is desirable for writing instrument ink compositions to have a satisfactory shelf life, including the period during which they are kept in their storage containers.

Investigation by the present inventors has revealed that W/O type emulsion inks are more prone to reduction in emulsion dispersibility when they are stored in storage containers than when they are filled into the ink holding tubes of writing instruments.

It is therefore an object of the present invention to provide an ink composition for a writing instrument that has a sufficiently excellent shelf life even during the period of container storage. It is another object of the invention to provide a writing instrument that can adequately maintain excellent writing properties for extended periods.

According to the invention there is provided an ink composition for a writing instrument having an aqueous component containing water, a thixotropic agent, a polyhydric alcohol and a pigment, dispersed in an oil component comprising dyes and non-dye components, wherein the IOB value for all of the dyes in the oil component is no greater than 0.9.

The IOB value for all of the dyes in the ink composition for a writing instrument is significantly lower than the prior art. The IOB value is a measure of the inorganicity (hydrophilicity) and organicity (lipophilicity) property of a substance. If the IOB value for all of the dyes is large as in conventional ink compositions for writing instruments, the dyes in the oil component will tend to migrate more easily into the aqueous component during emulsification. A large degree of dye migration may render the film of the aqueous component droplets more fragile. The IOB value for all of the dyes in the ink composition for a writing instrument of the invention is lower than the prior art. The dispersibility of the aqueous component in the oil component is therefore satisfactory, and the shelf life of the ink composition for a writing instrument as a W/O type emulsion is sufficiently excellent even during container storage. Addition of pigments to ordinary W/O type emulsion ink compositions has tended to lower the dispersibility of the emulsions. In the ink composition for a writing instrument according to the invention, however, the IOB value for all of the dyes is low and the emulsion dispersibility is satisfactory, thus allowing satisfactory dispersibility to be maintained even when a pigment is present. The ink composition for a writing instrument according to the invention thus has an excellent shelf life and can provide sufficiently high writing density when used.

According to the invention, the absolute value of the difference between the IOB value for all of the dyes and the IOB value of all of the non-dye components is preferably no greater than 0.3. If the difference between the IOB value for all of the dyes and the IOB value for all of the non-dye components is large, the dyes in the oil component will tend to migrate more easily into the aqueous component during emulsification. Such increased dye migration will tend to render the film of the aqueous component droplets more fragile. Thus, presumably the closer the IOB values for all of the dyes and all of the non-dye components, the more excellent will be the shelf life of the writing instrument ink composition as a W/O type emulsion.

According to the invention, the dye component is preferably a mixture of two or more dyes with different IOB values, and the maximum IOB value in the mixture is preferably less than 1.3. This will allow migration of the aqueous components of the dye to be adequately controlled, for even more satisfactory dispersibility of the aqueous component droplets in the oil component. The shelf life of the ink composition for a writing instrument can be further improved as a result.

The IOB value of all of the oil components in the ink composition for a writing instrument according to the invention is preferably 0.7-0.9. Using an oil component with an IOB value of 0.7-0.9 can result in more stable dispersion of the aqueous component.

According to the invention there is provided a writing instrument comprising the aforementioned ink composition for a writing instrument. Such a writing instrument is filled with an ink composition that has an adequately superior shelf life, and can therefore stably maintain excellent writing properties (smooth writing, writing density, writing fastness, etc.) for extended periods.

The writing instrument of the invention comprises an ink reservoir tube and a ball-point pen tip provided at the end of the ink reservoir tube, and it preferably has the aforementioned ink composition for a writing instrument in the ink reservoir tube. This will produce a writing instrument with even better writing properties.

The present invention can provide an ink composition for a writing instrument having a sufficiently excellent shelf life when stored in a container. The invention can also provide a writing instrument that can sufficiently maintain excellent writing properties for extended periods.

BRIEF DESCRIPTION OF THE DRAWINGS

FIG. 1 is a schematic cross-sectional view showing an embodiment of a ball-point pen according to the invention.

DESCRIPTION OF THE PREFERRED EMBODIMENT

A preferred embodiment of the invention will now be explained with reference to the accompanying drawings where necessary. The dimensional proportions of the ball-point pen depicted in the drawing are not necessarily limitative.

The ink composition for a writing instrument according to this embodiment is a W/O type emulsion ink composition having an aqueous component containing water, a polyhydric alcohol, a thixotropic agent and a pigment, dispersed in an oil component comprising one or more dyes and non-dye components. The components in the ink composition will now be explained in order.

The IOB value for all of the dyes in the oil component of this embodiment is no greater than 0.9. The IOB value is preferably 0.5-0.9 and more preferably 0.55-0.85. If the IOB value is less than 0.5, the solubility of the dye(s) in the oil component will be reduced, thus tending to impair the smooth writing. An IOB value of 0.55-0.85 will result in a high level for both properties, i.e. excellent dispersion stability and excellent writing feel.

When a plurality of dyes with different IOB values are included in the oil component of this embodiment, the maximum IOB value for the dyes is preferably less than 1.3 and more preferably no greater than 1.0. Limiting the maximum value to no greater than 1.0 will yield an ink composition with an even longer shelf life.

The term "IOB" used throughout the present specification is the abbreviation for "Inorganic value Organic value Balance", and it is the numerical value calculated as the inorganic value (IV)/organic value (IO) ratio (I/O ratio), based on the organic conception diagram. The "IOB" is explained in detail in "Organic conception diagram" (Koda, Y, Sankyo Publishing, 1984) and elsewhere. The method is a functional group contribution method wherein parameters are set for each functional group, and the inorganic value and organic value for each functional group are given. IV and IO represent the inorganic value and organic value, respectively. A larger IOB value indicates higher inorganicity.

Benzyl alcohol, for example, has a benzene ring and OH group with inorganicity, and 7 organic carbon atoms with organicity. In the organic conception diagram, the inorganic values (IV) of the benzene ring and OH group are 15 and 100, respectively, and the organic value (IO) of a carbon atom is 20. The IOB value of benzyl alcohol is therefore calculated in the following manner.

IOB(benzyl alcohol)=(15+100)/(20×7)=0.82

The IOB value of a mixture composed of multiple components is the weighted average of the IOB value of each component. Therefore when the oil component contains a plurality of dyes, the IOB value for all of the dyes may be calculated by the weighted average, based on the IOB value of each dye and the mass ratio. The IOB values for all of the non-dye components and all of the oil components can likewise be calculated by the weighted average.

Any known dyes may be used without any particular restrictions so long as they are oil-soluble dyes with IOB values within the aforementioned range. As examples of such dyes there may be mentioned direct dyes, acidic dyes and basic dyes. As specific examples of dyes there may be mentioned Valifast Red 1320, Valifast Yellow 1109, Valifast Violet 1704, Valifast Yellow 1108, Valifast Red 1362, Valifast Violet 1701, Valifast Blue 1623, Valifast Blue 1603, Valifast Black 61F, Valifast Green 1501 and Oil Blue 613 (all trade names of Orient Chemical Industries, Ltd.), and Aizen Spilon Yellow C-GH, Aizen Spilon Yellow C-GH new, Aizen Spilon Blue C-RH, Aizen Spilon Violet CR-H, Aizen Spilon Red C-GH, Aizen Spilon Red C-BH, Aizen Spilon Violet 555, Aizen Spilon S.P.T. Blue 111, Aizen Spilon Blue 121, Aizen Spilon Black GMH special and Aizen Spilon S.P.T. Orange-6 (all trade names of Hodogaya Chemical Co., Ltd.). These dyes may be used alone or in combinations of two or more. Because the ink composition of this embodiment contains a dye, it allows dense and clear writing.

The dye content is preferably 10-50 mass % and more preferably 10-30 mass % based on the total weight of the ink composition. If the content is less than 10 mass %, the writing clarity will tend to be reduced. On the other hand, a dye content of greater than 50 mass % will tend to increase the viscosity of the ink composition and writing feel will be poor.

The non-dye components in the oil component are the components other than dyes in the oil component, and they include, for example, polar solvents and thread property agents. As polar solvents, there may be used any ones commonly employed in oil-based inks for writing instruments. As examples of such polar solvents there may be mentioned glycol ethers such as ethyleneglycol monophenyl ether, propyleneglycol monophenyl ether, propyleneglycol dipropyleneglycol monomethyl ether, dipropyleneglycol monoethyl ether, dipropyleneglycol monobutyl ether and tripropyleneglycol monomethyl ether, and alcohols such as benzyl alcohol, ethylene glycol, triethylene glycol, propylene glycol and polyethylene glycol. Preferred are those with IOB values of 0.7-0.9.

The aforementioned polar solvents may be used alone or in combinations of two or more. When two or more are used in combination, the overall IOB value for the polar solvents is preferably 0.7-0.9.

The polar solvent content in the oil component is preferably 20-65 mass % and more preferably 35-55 mass % based on the total weight of the ink composition. If the content is less than 20 mass %, thin writing spots will tend to result. A content of greater than 65 mass %, on the other hand, will tend to interfere with clear writing.

As examples of thread property agents there may be mentioned polyvinylpyrrolidone, polyvinyl alcohol, polyethylene oxide and hydroxypropylcellulose. Any of these may be used alone or in combinations of two or more. Using a thread property agent can prevent blotting during writing or leaking of the ink when standing. It can also provide further stabilization for emulsions. Because the ink has suitable viscoelasticity as well, it allows smooth writing feel to be achieved.

The thread property agent content is preferably 0.1-3.0 mass % and more preferably 0.2-2.0 mass % based on the total weight of the ink composition. A content of less than 0.5 mass % will tend to result in blotting during writing or leaking of the ink when standing. On the other hand, a dye content of greater than 3.0 mass % will tend to increase the viscosity of the ink composition, cause thin writing spots and poor writing feel.

The non-dye components in the oil component may also contain other additives in addition to the materials mentioned above. Examples of such additives include viscosity modifiers (resins and the like), lubricants and antioxidants.

As examples of viscosity modifiers there may be mentioned ketone resins, sulfoamide resins, mallein resins, xylene resins, amide resins, alkyd resins, phenol resins, rosin resins, terpene resins, butyral resins and the like.

The non-dye components in the oil component may contain various substances as mentioned above. The IOB value for all of the non-dye components in the oil component is preferably 0.7-0.9. If the IOB value for all of these components is within this range, even more satisfactory stability can be achieved for the W/O type emulsion. The IOB value for all of the components is the average value calculated as the weighted average of the IOB values for each of the substances in the components.

The absolute value of the difference between the IOB value for all of the dyes and the IOB value for all of the non-dye components in the oil component is preferably 0-0.25 and more preferably 0-0.23. Including an oil component with a small difference in the absolute value will yield an ink composition with an even longer shelf life.

The IOB value for all of the oil components is preferably 0.7-0.9 and more preferably 0.75-0.85. Using oil components with an overall IOB value of 0.75-0.85 can result in even more stable dispersion of the aqueous component described hereunder.

The aqueous component contains water, a polyhydric alcohol, a thixotropic agent and a pigment. With conventional low-viscosity oil-based ink compositions, the written ink tends to seep into the paper and penetrate to the rear side. However, the ink composition of this embodiment contains water and can therefore adequately prevent such rear side penetration. The water content is preferably 5-30 mass % and more preferably 10-20 mass % based on the total weight of the ink composition. A content of less than 5 mass % will tend to lack in smoothness, while a content of greater than 30 mass % will tend to impair the stability of the emulsion.

As examples of polyhydric alcohols there may be mentioned ethylene glycol, propylene glycol, glycerin, diethylene glycol and polyethylene glycol. Any of these may be used alone or in combinations of two or more. Using a polyhydric alcohol can help maintain emulsion stability.

The polyhydric alcohol content is preferably 5-30 mass % and more preferably 10-20 mass % based on the total weight of the ink composition. If the content is less than 5 mass %, the emulsion stability will tend to be reduced. On the other hand, a content of greater than 30 mass % will tend to increase the viscosity of the ink composition and be poor writing feel, while also producing very thin writing spots.

As examples of thixotropic agents there may be mentioned xanthan gum, locust bean gum, welan gum, gellan gum, guar gum, pectin, carrageenan, carboxyvinyl polymer, gum arabic, tragacanth gum, rhamsan gum, gelatin, sodium alginate and carboxymethylcellulose. Any of these may be used alone or in combinations of two or more. Using a thixotropic agent can impart a thixotropic property to the ink composition, to obtain an effect that produces smooth writing. An emulsion-stabilizing effect is also obtained.

The thixotropic agent content is preferably 0.1-2.0 mass % and more preferably 0.1-0.5 mass % based on the total weight of the ink composition. If the content is less than 0.1 mass %, the thixotropic property of the ink composition will tend to be lower, thus lacking in smoothness. On the other hand, a content of greater than 2.0 mass % will tend to increase the viscosity of the ink composition and thus lack in smoothness.

As pigments there may be used any publicly known compounds, without any particular restrictions. As examples of such pigments there may be mentioned common organic pigments such as carbon black, insoluble azo-based, azo lake-based, condensed azo-based, diketopyrrolopyrrole-based, phthalocyanine-based, quinacridone-based, anthraquinone-based, dioxazine-based, indigo-based, thioindigo-based, quinophthalone-based, threne-based and isoindolinone-based pigments. Any of these may be used alone or in combinations of two or more. The use of a pigment can produce dense, clear writing, as well as sufficient light resistance of written ink.

The pigment content is preferably 0.5-10 mass % and more preferably 1-5 mass % based on the total weight of the ink composition. If the content is less than 0.5 mass %, the writing density, clarity and light fastness will tend to be reduced. A content of greater than 10 mass %, on the other hand, will tend to produce aggregation and deposition of the pigment.

The aqueous component preferably further contains a pigment dispersant. The pigment dispersant is not particularly restricted so long as it permits dispersion of the pigment. As examples there may be mentioned water-soluble resins obtained by polymerizing, for example, acrylic acid or its ester, methacrylic acid or its ester or maleic acid or its ester alone, or copolymerizing it with styrene, acrylonitrile, vinyl acetate or the like, and neutralizing the resin with an alkali metal or an amine to render it water-soluble, as well as anionic surfactants, nonionic surfactants and the like. Water-soluble resins are preferred among these, and specifically styrene-maleic acid copolymer is particularly preferred. Any of these may be used alone or in combinations of two or more. Using a pigment dispersant can inhibit pigment deposition and aggregation that can occur with time. It can also provide even further emulsion stability.

The pigment dispersant content is preferably 0.5-5.0 mass % and more preferably 1.0-2.0 mass % based on the total weight of the ink composition. A content of less than 0.5 mass % will tend to produce aggregation and deposition of the pigment with time. On the other hand, a content of greater than 5.0 mass % will tend to increase the viscosity of the ink composition and thus lack in smoothness.

The aqueous component preferably further contains a lubricant. As examples of lubricants there may be mentioned polyalkyleneglycol derivatives, fatty acid salts, nonionic surfactants and phosphate. Fatty acid salts are preferred among these, and specifically potassium oleate is particularly preferred. Any of these may be used alone or in combinations of two or more. Using a lubricant can prevent wear of the ball striker caused by the pigment.

The lubricant content is preferably 0.1-3.0 mass % and more preferably 0.3-1.0 mass % based on the total weight of the ink composition. A content of less than 0.1 mass % will tend to reduce the wear-inhibiting effect for the ball striker, while a content of greater than 3.0 mass % will tend to reduce the time-dependent stability of the ink composition.

The aqueous component may also contain other additives in addition to the materials mentioned above. As examples of such additives there may be mentioned rust-preventive agents, antimicrobial agents, humectants, pH regulators and the like.

As examples of rust-preventive agents there may be mentioned benzotriazole, tolyltriazole, octyl phosphate, imidazole, benzoimidazole, ethylenediaminetetraacetic acid salts and the like.

As examples of antimicrobial agents there may be mentioned pentachlorophenol sodium, sodium benzoate, potassium sorbate, sodium dehydroacetate, 1,2-benzoisothiazolin-3-one, 2,4-thiazolylbenzimidazole, paraoxybenzoic acid esters and the like.

As examples of humectants there may be mentioned urea, thiourea, ethyleneurea and the like.

As examples of pH regulators there may be mentioned triethanolamine, diethanolamine, monoethanolamine, ammonia water, sodium hydroxide, potassium hydroxide, sodium carbonate, sodium hydrogencarbonate and the like.

The ink composition of this embodiment is obtained by mixing the aforementioned oil component and aqueous component. The ink composition is a W/O type emulsion ink having aqueous droplets composed of the aqueous component, dispersed in the oil component.

If the diameters of the droplets of the aqueous component dispersed in the oil component are too small in the ink composition of this embodiment, the writing feel might be poor. From this viewpoint, the mean particle size of the aqueous component is preferably 0.1-10.0 µm and more preferably 1.0-6.0 µm. The mean particle size of the aqueous component may be determined, for example, by observing the ink composition with an optical microscope or the like to measure the diameters of the droplets, and calculating the average at 10 arbitrary points. If the mean particle size of the droplets is within the aforementioned range it will be possible to achieve especially smooth writing. The mean particle size of the droplets can be adjusted primarily by varying the mixing conditions for the oil component and aqueous component. The mean particle size of the droplets can also be adjusted by varying the composition of the oil component and aqueous component.

The relative contents of the oil component and aqueous component in the ink composition of this embodiment (oil component:aqueous component) is preferably in a weight ratio range of 6:4-8:2. If the oil component proportion exceeds this range, the condition will approach that of an ordinary oil-based ink, thus lacking in smoothness and tending to result in thin writing spots and bleeding, as well as more blotting on paper surfaces. If the oil component proportion is below this range, on the other hand, the writing feel might be poor and more thin writing spots will tend to be produced.

Mixture of the oil component and aqueous component can be accomplished, for example, using an agitator such as a dissolver, Henschel mixer or homomixer. The mixing conditions are not particularly restricted. For example, a dissolving agitator may be used for agitation at 100-1000 rpm for 30-180 minutes to form a W/O type emulsion ink having droplets with the aforementioned mean particle size uniformly dispersed in the oil component.

A ball-point pen will now be explained as an embodiment of a writing instrument according to the invention. FIG. 1 is a schematic cross-sectional view showing the ball-point pen of this embodiment. In the ball-point pen 100 shown in FIG. 1, an ink composition 12 is filled into an ink holding tube 14. A ball-point pen tip 20 is provided at one end of the ink holding tube 14. The ball-point pen tip 20 is composed of a ball holder 24 and a ball 26, and it is anchored to the ink holding tube 14 by a joint 22. A backflow preventer 16 is housed adjacent to the ink composition 12 in the ink holding tube 14, at the end of the ink composition 12 opposite the ball-point pen tip 20 end. The backflow preventer 16 is situated in such a manner that no gap is formed between it and the ink composition 12.

A core 10 is formed in the ball-point pen 100 by the ink holding tube 14, ball-point pen tip 20, ink composition 12 and backflow preventer 16. The core 10 is inserted on the main body axis 18, and a pallet 28 with an open hole is fitted at the back end of the main body axis 18 (the end opposite the ball-point pen tip 20).

The constituent elements of the ball-point pen 100 will now be explained. Except for the ink composition 12, common constituent elements ordinarily used in ball-point pens may be applied to this construction. An ink composition according to the embodiment described above is used for the ink composition 12.

The ink holding tube 14 may be made of a resin such as polypropylene, polyethylene, polyethylene terephthalate, nylon, polyacetal, polycarbonate or the like, or it may be made of metal. There are no particular restrictions on the shape of the ink holding tube 14, and a cylindrical shape, for example, may be employed.

The backflow preventer 16 has a function of preventing outflow of the ink composition (outflow preventing function) and a function of preventing dry-up of the ink composition (sealing function). Any publicly known backflow preventer having such functions may be used in the ball-point pen of this embodiment, without any particular restrictions. The backflow preventer 16 may comprise a base oil and a thickener, for example. As base oils there may be mentioned mineral oils, polybutene, silicon oil, glycerin, polyalkylene glycol and the like. As thickeners there may be mentioned metal soap-based thickeners, organic thickeners, inorganic thickeners and the like.

Preferably, the viscosity of the backflow preventer 16 and the difference in specific gravity of the ink composition 12 and backflow preventer 16 are adjusted so that the backflow preventer 16 does not accumulate in the ink composition 12 when the ball-point pen tip 20 is pointing downward. The backflow preventer 16 preferably has a composition that is immiscible with the ink composition 12.

A member made of a plastic material such as polypropylene, for example, may be used for the main body axis 18 and pallet 28.

The joint 22 may be made of, for example, polypropylene, polyethylene, polyethylene terephthalate, nylon, polyacetal, polycarbonate or the like.

The joint 22, ball holder 24 and ball 26 in the ball-point pen tip 20 may be ones that are commonly used in ball-point pens. The diameter of the ball 26 is preferably 0.3-1.2 mm.

The ball-point pen 100 of this embodiment having the construction described above may be produced by a production process for ordinary ball-point pens.

Preferred embodiments of an ink composition and a ball-point pen filled with the ink composition according to the invention were described above, but the ink composition and writing instrument are not restricted to these embodiments. For example, the ball-point pen of this embodiment may lack the main body axis 18, and the ink holding tube 14 itself may serve as the main body axis. Also, the ball-point pen of this embodiment may have a pressing mechanism whereby the ink composition 12 and backflow preventer 16 in the ink holding tube 14 are pressed from the back end (the end opposite the ball-point pen tip 20). The ball-point pen of this embodiment may lack the backflow preventer 16 as well.

The ink composition of the invention is not limited to use in a ball-point pen, and may instead by used in marking pens including brush pens, or in writing instruments that employ valve mechanisms at the ink injection sections.

EXAMPLES

The invention will now be explained in greater detail based on examples and comparative examples. However, the invention is not limited to the examples described below.

Examples 1-4 and Comparative Examples 1-9

Each of the starting materials listed in Tables 1 and 2 were combined in the amounts (parts by weight) listed in the tables and mixed with a reciprocating rotating agitator to separately prepare oil components and aqueous components. Next, a dissolving agitator was used to add each aqueous component while stirring the oil component, and the mixture was stirred for 1 hour at room temperature (25° C.), 300 rpm. This produced W/O type emulsion ink compositions for Examples 1-4 and Comparative Examples 1-9, having droplets of the aqueous components dispersed in the oil components.

The details of the starting materials listed in Tables 1 and 2 are as follows.
Polyvinylpyrrolidone K-90 (trade name): Nippon Shokubai Co., Ltd.
Oleic acid: LUNAC O-LL (trade name), Kao Corp.
SPIRON VIOLET C-RH (trade name): Hodogaya Chemical Co., Ltd.
SPIRON BLUE C-RH (trade name): Hodogaya Chemical Co., Ltd.
VALIFAST VIOLET 1704 (trade name): Orient Chemical Industries, Ltd.
SPIRON YELLOW C-GNH new (trade name): Hodogaya Chemical Co., Ltd.
SPIRON RED C-GH (trade name): Hodogaya Chemical Co., Ltd.
VALIFAST YELLOW 1109 (trade name): Orient Chemical Industries, Ltd.
SPILIT BLACK 61F (trade name): Orient Chemical Industries, Ltd.
SPILIT BLUE 111 (trade name): Orient Chemical Industries, Ltd.
VALIFAST BLUE 1623 (trade name): Orient Chemical Industries, Ltd.
VALIFAST RED 2320 (trade name): Orient Chemical Industries, Ltd.
VALIFAST BLUE N (trade name): Orient Chemical Industries, Ltd.
Xanthan gum: MONAD GUM GS (trade name): Dainippon Pharmaceutical Co., Ltd.
Welan gum: KELCO-CRETE (KIC376) (trade name), Sansho Co., Ltd.
Locust bean gum: GENUGUM type RL-200-J (trade name), Sansho Co., Ltd.
CARBOPOL 941 (trade name): BF Goodrich, carboxyvinyl polymer.
Rust-preventive agent: COROMIN CB (trade name), Chelest Corp.
Antimicrobial agent: SUROUT 99N (trade name), Japan EnviroChemicals, Ltd.
Potassium oleate: NONSOUL OK-1 (trade name), NOF Corp.
Pigment dispersant (styrene-maleic acid copolymer): SMA100H Solution (trade name), Sartomer Co., Inc.

The IOB values of each of the starting materials for the oil component are shown in Tables 1 and 2.

[Evaluation of Shelf Life]

After placing 5 g of ink composition prepared in the manner described above in a container (13.5 ml) by Maruemu Corp. and sealing it, it was stored in an environment of 60° C., 0% RH for 60 days. The droplet dispersion stability was evaluated immediately after sealing and after 60 days of storage based on the following criteria. The results are shown in Tables 1 and 2.

A: Aqueous component uniformly dispersed in oil component.
B: Aqueous component partially aggregated.
C: No emulsion formed.

TABLE 1

| | Starting material | IOB | Example 1 | Example 2 | Example 3 | Example 4 | Comp. Ex. 1 | Comp. Ex. 2 |
|---|---|---|---|---|---|---|---|---|
| *1 Non-dye components | Ethyleneglycol monophenyl ether | 0.84 | 33.4 | 35.7 | 46.2 | 31.4 | 37.8 | 39.2 |
| | Benzyl alcohol | 0.82 | 8.4 | 8.4 | 8.4 | 8.6 | 8.4 | 8.4 |
| | Polyvinylpyrrolidone K-90 | 1.75 | 0.2 | 1.4 | 1.4 | 1.4 | 1.8 | 1.4 |
| | Oleic acid | 0.23 | | | | | 1.1 | |
| Dyes | SPILON VIORET C-RH | 0.56 | | | | | 5.6 | |
| | SPILON BLUE C-RH | 0.65 | | 24.5 | 14.0 | | | |
| | VALIFAST VIOLET 1704 | 0.78 | 21.0 | | | | | |
| | SPILON YELLOW C-GNH new | 0.79 | | | | 22.9 | | |
| | SPILON RED C-GH | 0.81 | | | | 5.7 | | |
| | VALIFAST YELLOW 1109 | 1.00 | 7.0 | | | | | |
| | SPILIT BLACK 61F | 1.30 | | | | | | |
| | SPILIT BLUE 111 | 1.30 | | | | | | 21.0 |
| | VALIFAST BLUE 1623 | 1.30 | | | | | | |
| | VALIFAST RED 2320 | 1.66 | | | | | | |
| | VALIFAST BLUE N | 1.76 | | | | | 15.4 | |
| *2 Water | Ion-exchanged water | 2.00 | 14.1 | 14.1 | 14.1 | 14.1 | 14.1 | 14.1 |
| Polyhydric alcohol | Glyerin | — | 6.0 | 6.0 | 6.0 | 6.0 | 6.0 | 6.0 |
| | Ethylene glycol | — | 4.0 | 4.0 | 4.0 | 4.0 | 4.0 | 4.0 |
| Thixotropic agent | Xanthan gum | — | 0.2 | 0.2 | 0.2 | 0.2 | 0.2 | 0.2 |
| | Welan gum | — | | | | | | |
| | Locust bean gum | — | | | | | | |
| | CARBOPOL 941 | — | | | | | | |
| Pigment dispersant | Pigment dispersant | — | 1.5 | 1.5 | 1.5 | 1.5 | 1.5 | 1.5 |
| Pigments | Carbon black | — | 2.5 | | | | | |
| | Blue pigment | — | | 2.5 | 2.5 | | 2.5 | 2.5 |
| | Red pigment | — | | | | 2.5 | | |
| Additives | Rust-preventive agent | — | 0.5 | 0.5 | 0.5 | 0.5 | 0.5 | 0.5 |
| | Antimicrobial agent | — | 0.5 | 0.5 | 0.5 | 0.5 | 0.5 | 0.5 |
| Lubricant | Potassium oleate | — | 0.8 | 0.8 | 0.8 | 0.8 | 0.8 | 0.8 |
| | Total | | 100.0 | 100.0 | 100.0 | 100.0 | 100.0 | 100.0 |
| | IOB value for all dyes (1) | | 0.84 | 0.65 | 0.65 | 0.79 | 1.44 | 1.30 |
| | IOB value for all non-dye components (2) | | 0.84 | 0.86 | 0.86 | 0.87 | 0.86 | 0.86 |
| | (2) − (1) | | 0.01 | 0.21 | 0.21 | 0.07 | −0.58 | −0.44 |

TABLE 1-continued

|  | Starting material | IOB | Example 1 | Example 2 | Example 3 | Example 4 | Comp. Ex. 1 | Comp. Ex. 2 |
|---|---|---|---|---|---|---|---|---|
|  | IOB value for all oil components |  | 0.84 | 0.79 | 0.82 | 0.84 | 1.03 | 0.99 |
| Droplet dispersion stability | After sealing |  | A | A | A | A | A | A |
|  | After 60 days |  | A | A | A | A | C | B |

*1: Oil Component
*2: Aqueous Component

TABLE 2

|  | Starting material | IOB | Comp. Ex. 3 | Comp. Ex. 4 | Comp. Ex. 5 | Comp. Ex. 6 | Comp. Ex. 7 | Comp. Ex. 8 | Comp. Ex. 9 |
|---|---|---|---|---|---|---|---|---|---|
| *1 Non-dye components | Ethyleneglycol monophenyl ether | 0.84 | 35.7 | 39.0 | 30.5 | 30.5 | 30.5 | 30.5 | 26.1 |
|  | Benzyl alcohol | 0.82 | 8.4 | 8.6 | 8.0 | 8.0 | 8.0 | 8.0 | 6.9 |
|  | Polyvinylpyrrolidone K-90 | 1.75 | 1.4 | 1.4 | 1.0 | 1.0 | 1.0 | 1.0 | 0.9 |
|  | Oleic acid | 0.23 |  |  | 1.5 | 1.5 | 1.5 | 1.5 | 1.3 |
| Dyes | SPILON VIORET C-RH | 0.56 |  |  |  |  |  |  |  |
|  | SPILON BLUE C-RH | 0.65 |  |  |  |  |  |  |  |
|  | VALIFAST VIOLET 1704 | 0.78 |  |  | 15.0 | 15.0 | 15.0 | 15.0 | 12.9 |
|  | SPILON YELLOW C-GNH new | 0.79 |  |  |  |  |  |  |  |
|  | SPILON RED C-GH | 0.81 |  |  |  |  |  |  |  |
|  | VALIFAST YELLOW 1109 | 1.00 |  |  | 6.0 | 6.0 | 6.0 | 6.0 | 5.1 |
|  | SPILIT BLACK 61F | 1.30 |  |  | 8.0 | 8.0 | 8.0 | 8.0 | 6.9 |
|  | SPILIT BLUE 111 | 1.30 |  |  |  |  |  |  |  |
|  | VALIFAST BLUE 1623 | 1.30 | 24.5 |  |  |  |  |  |  |
|  | VALIFAST RED 2320 | 1.66 |  | 21.0 |  |  |  |  |  |
|  | VALIFAST BLUE N | 1.76 |  |  |  |  |  |  |  |
| *2 Water | Ion-exchanged water | 2.00 | 14.1 | 14.1 | 14.1 | 14.1 | 14.1 | 14.1 | 18.7 |
| Polyhydric alcohol | Glycerin | — | 6.0 | 6.0 | 6.0 | 6.0 | 6.0 | 6.0 | 8.0 |
|  | Ethylene glycol | — | 4.0 | 4.0 | 4.0 | 4.0 | 4.0 | 4.0 | 5.3 |
| Thixotropic agent | Xanthan gum | — | 0.2 | 0.2 | 0.2 |  |  |  | 0.3 |
|  | Welan gum | — |  |  |  | 0.2 |  |  |  |
|  | Locust bean gum | — |  |  |  |  | 0.2 |  |  |
|  | CARBOPOL 941 | — |  |  |  |  |  | 0.2 |  |
| Pigment dispersant | Pigment dispersant | — | 1.5 | 1.5 | 1.5 | 1.5 | 1.5 | 1.5 | 2.0 |
| Pigments | Carbon black | — |  |  | 2.5 | 2.5 | 2.5 | 2.5 | 3.3 |
|  | Blue pigment | — | 2.5 |  |  |  |  |  |  |
|  | Red pigment | — |  | 2.5 |  |  |  |  |  |
| Additives | Rust-preventive agent | — | 0.5 | 0.5 | 0.5 | 0.5 | 0.5 | 0.5 | 0.7 |
|  | Antimicrobial agent | — | 0.5 | 0.5 | 0.5 | 0.5 | 0.5 | 0.5 | 0.7 |
| Lubricant | Potassium oleate | — | 0.8 | 0.8 | 0.8 | 0.8 | 0.8 | 0.8 | 1.0 |
|  | Total |  | 100.0 | 100.0 | 100.0 | 100.0 | 100.0 | 100.0 | 100.0 |
|  | IOB value for all dyes (1) |  | 1.30 | 1.66 | 0.97 | 0.97 | 0.97 | 0.97 | 0.97 |
|  | IOB value for all non-dye components (2) |  | 0.86 | 0.86 | 0.84 | 0.84 | 0.84 | 0.84 | 0.84 |
|  | (2) − (1) |  | −0.44 | −0.80 | −0.13 | −0.13 | −0.13 | −0.13 | −0.13 |
|  | IOB value for all oil components |  | 1.02 | 1.10 | 0.89 | 0.89 | 0.89 | 0.89 | 0.89 |
| Droplet dispersion stability | After sealing |  | A | B | A | A | A | A | A |
|  | After 60 days |  | C | C | C | C | C | C | C |

*1: Oil Component
*2: Aqueous Component

As seen in Tables 1 and 2, the ink compositions of Examples 1-4 wherein the IOB for all of the dyes was no greater than 0.9 maintained satisfactory dispersibility even after 60 days, thus confirming an excellent shelf life. On the other hand, it was demonstrated that the ink compositions of Comparative Examples 1-9 wherein the IOB value for all of the dyes was greater than 0.9 could not maintain satisfactory dispersibility.

What is claimed is:

1. An ink composition for a writing instrument, comprising:
    an oil component containing dyes and non-dye components; and
    an aqueous component containing water, a thixotropic agent, a polyhydric alcohol and a pigment, dispersed in the oil component,
    wherein the IOB value for all of the dyes in the oil component is no greater than 0.9.

2. An ink composition for a writing instrument according to claim 1, wherein the absolute value for the difference between the IOB value for all of the dyes and the IOB value for all of the non-dye components is no greater than 0.3.

3. An ink composition for a writing instrument according to claim 2, wherein the dyes consist of a mixture of two or more with different IOB values, and
    the maximum IOB value of the mixture is less than 1.3.

4. An ink composition for a writing instrument according to claim 3, wherein the IOB value for all of the oil components is 0.7-0.9.

5. An ink composition for a writing instrument according to claim 2, wherein the IOB value for all of the oil components is 0.7-0.9.

6. A writing instrument comprising the ink composition according to claim 2.

7. A writing instrument according to claim 6, which comprises an ink reservoir tube and a ball-point pen tip provided at the end of the ink reservoir tube, and which has the ink composition in the ink reservoir tube.

8. An ink composition for a writing instrument according to claim 1, wherein the dyes consist of a mixture of two or more with different IOB values, and the maximum IOB value of the mixture is less than 1.3.

9. An ink composition for a writing instrument according to claim 8, wherein the IOB value for all of the oil components is 0.7-0.9.

10. A writing instrument comprising the ink composition according to claim 8.

11. A writing instrument according to claim 10, which comprises an ink reservoir tube and a ball-point pen tip provided at the end of the ink reservoir tube, and which has the ink composition in the ink reservoir tube.

12. An ink composition for a writing instrument according to claim 1, wherein the IOB value for all of the oil components is 0.7-0.9.

13. A writing instrument comprising the ink composition according to claim 12.

14. A writing instrument according to claim 13, which comprises an ink reservoir tube and a ball-point pen tip provided at the end of the ink reservoir tube, and which has the ink composition in the ink reservoir tube.

15. A writing instrument comprising the ink composition according to claim 1.

16. A writing instrument according to claim 15, which comprises an ink reservoir tube and a ball-point pen tip provided at the end of the ink reservoir tube, and which has the ink composition in the ink reservoir tube.

* * * * *